United States Patent
Hayashi

[11] Patent Number: 5,805,351
[45] Date of Patent: Sep. 8, 1998

[54] HIGH SPEED WIDE ANGLE ZOOM LENS SYSTEM

[75] Inventor: Kiyoshi Hayashi, Tokyo, Japan

[73] Assignee: Nikon Corporation, Tokyo, Japan

[21] Appl. No.: 816,911

[22] Filed: Mar. 13, 1997

[51] Int. Cl.⁶ .......................... G02B 15/14; G02B 13/18
[52] U.S. Cl. ................................... 359/686; 359/708
[58] Field of Search ........................ 359/686, 683, 359/676, 708

[56] References Cited

U.S. PATENT DOCUMENTS

| | | | |
|---|---|---|---|
| 4,591,235 | 5/1986 | Tokumaru et al. | 359/686 |
| 4,653,873 | 3/1987 | Kawamura | 359/686 |
| 4,759,617 | 7/1988 | Tokumaru et al. | 359/686 |
| 4,846,562 | 7/1989 | Tokumaru et al. | 359/686 |
| 5,078,481 | 1/1992 | Nakayama et al. | 359/686 |
| 5,132,848 | 7/1992 | Nishio et al. | 359/686 |
| 5,264,965 | 11/1993 | Hirakawa | 359/683 |
| 5,276,553 | 1/1994 | Tatsuno | 359/686 |
| 5,329,401 | 7/1994 | Sato | 359/686 |
| 5,416,639 | 5/1995 | Yamanashi | 359/683 |
| 5,576,890 | 11/1996 | Tanaka et al. | 359/686 |
| 5,585,970 | 12/1996 | Shibayama | 359/686 |
| 5,721,642 | 2/1998 | Shibayama et al. | 359/686 |

*Primary Examiner*—Scott J. Sugarman
*Attorney, Agent, or Firm*—Joseph T. Fitzgerald; H. Donald Nelson

[57] ABSTRACT

A large aperture wide angle zoom lens system including four groups of lenses. The four lens groups, viewed from the object side, include a first group with negative refractive power, a second group with positive refractive power, a third group with negative refractive power, and a fourth group with positive refractive power. The zoom lens system is capable of maintaining the position of the image constant during zooming, has fine imaging performance despite a large zoom ratio of 2× and a speed which is as fast as F/2.8 with an angle of view of 84° on the wide side.

19 Claims, 9 Drawing Sheets

FIG. 5A
Spherical Aberration
H=8.4 (F/2.8)

FIG. 5B
Astigmatism
Y=21.6

FIG. 5C
Distortion

FIG. 5D
Lateral Aberration

FIG. 6

FIG. 7A Spherical Aberration H=4.3 (F/2.8)

FIG. 7B Astigmatism Y=21.6

FIG. 7C Distortion

FIG. 7D Lateral Aberration

FIG. 8A Spherical Aberration H=6.0 (F/2.8)

FIG. 8B Astigmatism Y=21.6

FIG. 8C Distortion

FIG. 8D Lateral Aberration

HIGH SPEED WIDE ANGLE ZOOM LENS SYSTEM

BACKGROUND OF THE INVENTION

1. Field of the Invention

The present invention relates to a zoom lens suitable for a still camera such as an SLR camera. More particularly, the present invention relates to a compact, high performance zoom lens, preferably having a zoom ratio of approximately 2×, an F number of F/2.8, and which includes a wide angle range where an angle of view on the wide side extends to 84°.

2. Description of the Related Arts

The use of lenses with a small F number is increasing, even with zoom ratios of approximately 2×, due in part to the demand of skilled non-professional photographers and professional photographers. The design of a high zoom ratio zoom lens has been settled for some time, at least in terms of a zoom lens for an SLR using standard 35 mm (i.e. 24 mm×36 mm) size film. What is known to be a suitable zoom type design for a zoom lens having a wide angle range and a high zoom ratio or large aperture is a group of lenses with negative power disposed on the object side including four groups of lenses. These lens groups typically have a negative, positive, negative, positive power configuration. Examples of zoom lenses using this configuration can be seen in, for example, U.S. Pat. No. 4,516,839 (JP Sho 58-4113), U.S. Pat. No. 4,759,617 (JP Sho 58-95315) and Japanese Patent Publication Hei 6-82698.

However, the lenses disclosed in the above-mentioned prior art patents have several drawbacks. For example, such lenses typically have an F number larger than 3.5. In those cases where the F number is less (e.g., approximately 2.8), either the focal length on the wide side is longer than 28 mm for standard 35 mm size film or the structure of the first group of lenses is overly complicated. None of the prior art lens systems discussed above has a focal length of 28 mm or less on the wide side and in addition has achieved and F number of F/2.8 over the entire zoom range.

Accordingly, there is a need for a zoom lens system for use with, for example, SLR camera systems which utilize standard 35 mm film which includes a wide angle of view, has a focal length on the wide side of 24 mm and a focal length on the tele-side extending to a standard 50 mm, while maintaining a large aperture over the entire zoom range. Such a lens should preferably have an F number of 2.8 over the entire zoom range, be compact, and capable of high performance characteristics to satisfy the amateur, skilled non-professional, and professional photographer who uses such a lens system.

SUMMARY OF THE INVENTION

The above and other objects and advantages of the present invention are achieved in one embodiment of the present invention in which an optical system includes four groups of lenses, the four groups of lenses (viewed from the object side) include a first group of lenses with negative refractive power, a second group of lenses with positive refractive power, a third group of lenses with negative refractive power, and a fourth group of lenses with positive refractive power. In this embodiment, a diaphragm is disposed between the second group of lenses and the fourth group of lenses, such that during a zoom from the wide side to the tele side, the focal length of the entire system is changed by changing the respective air thickness between the first, second, third, and fourth groups of lenses. For example, the air thickness between the first group of lenses and the second group of lenses, and the air thickness between the third group of lenses and the fourth group of lenses is decreased while the air thickness between the second group of lenses and the third group of lenses is increased.

In addition, the above and other objects and advantages of the present invention are achieved through a lens system in which the position of the image surface is maintained constant, and where the fourth group of lenses includes, viewed from the object side, at least two positive lens elements, a negative lens element, and a positive lens element, satisfying the following conditions:

$$0.8 < |f_4/f_3| < 1.0 \tag{1}$$

$$1.2 < |f_1|/\sqrt{f_w \cdot f_T} < 1.5 \tag{2}$$

$$-1.7 < (r_{412} + r_{411})/(r_{412} - r_{411}) < -0.7 \tag{3}$$

wherein, $f_3$: a composite focal length of the third group of lenses
$f_4$: a composite focal length of the fourth group of lenses
$f_1$: a composite focal length of the first group of lenses
$f_w$: a focal length of an entire system on the wide side
$f_T$: a focal length of an entire system on the tele side
$r_{411}$: an objectwise radius of curvature of a positive lens on the most object side of the fourth group of lenses
$r_{412}$: an imagewise radius of curvature a positive lens on the most object side of the fourth group of lenses.

A more complete understanding of the present invention will be had based upon a reading of the detailed description of the preferred embodiments of the present invention when considered in conjunction with the drawings, of which the following is a brief description.

DETAILED DESCRIPTION OF THE PREFERRED EMBODIMENT

The following detailed description is of the presently preferred embodiments of the present invention. It is to be understood that while the detailed description is given utilizing the drawings briefly described above, the invention is not limited to the illustrated embodiments. In the detailed description, like reference numbers refer to like elements. Further, in the following detailed description, reference will be made to the use of 35 mm film (i.e. 24 mm×36 mm) in connection with the zoom lens system of the present invention. However, it should be understood that the present invention is in no way limited to use with 35 mm film, but is suitable for use with other film types, such as the Advanced Photosystem Film (APS) (i.e. 18 mm×24 mm), 4×5 (40 mm×50 mm) film, or other types of film.

Figure 1:
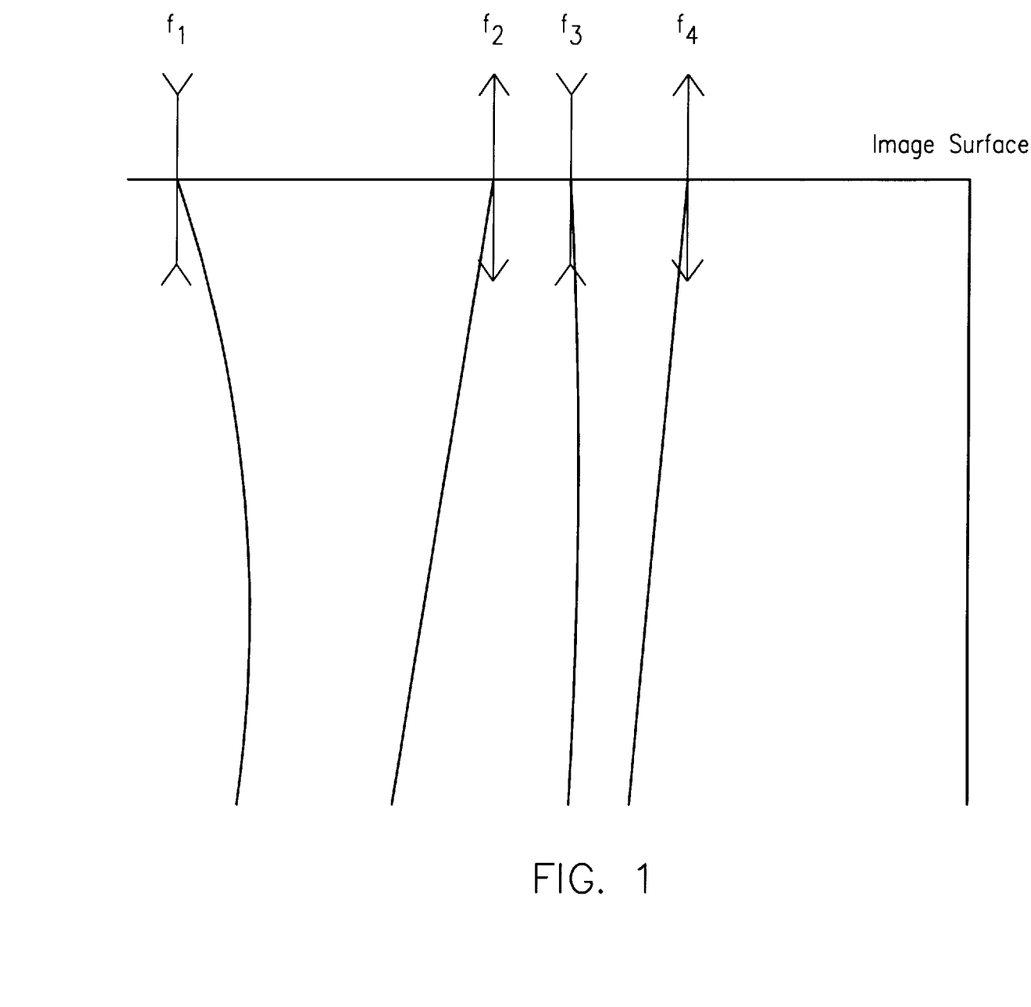
FIG. 1 illustrates in graphical form the movements of each group of lenses in a four-group type zoom lens system at the time of power variation in accordance with the present invention.

FIG. 1 shows the grouping structure of the zoom lens system in accordance with the present invention. Referring to FIG. 1, the left portion of the figure is the object side, and the right portion is the image surface side. As illustrated, in order of succession from the object side this embodiment of the invention includes a first group of lenses with negative refractive power, a second group of lenses with positive refractive power, a third group of lenses with negative refractive power, and a fourth group of lenses with positive refractive power.

During a zoom operation from the wide side (i.e. the upper portion of FIG. 1) to the tele side (i.e. the lower portion of FIG. 1), each lens group moves so as to decrease the air gap between the first group of lenses and the second group of lenses, increase the air gap between the second group of lenses and the third group of lenses, and to decrease the air gap between the third group of lenses and the fourth group of lenses. Because of the movement of each lens group, the focal length of the zoom lens system according to this embodiment of the invention is changeable, while the position of the image surface is maintained constant.

In accordance with this embodiment, a diaphragm or aperture stop (not shown in FIG. 1) is disposed in between the first group of lenses and the fourth group of lenses, while the structure of the lens groups satisfies the following conditional expressions (1) and (2):

$$0.8 < |f_4/f_3| < 1.0 \quad (1)$$

$$1.2 < |f_1|/\sqrt{f_w \cdot f_T} < 1.5 \quad (2)$$

where, $f_3$: a composite focal length of the third group of lenses, $f_4$: a composite focal length of the fourth group of lenses, $f_1$: a composite focal length of the first group of lenses, $f_w$: a focal length of a zoom lens system on the wide side, $f_T$: a focal length of a zoom lens system on the tele side.

As described above, this embodiment of the present invention has a negative, positive, negative, and positive refractive power arrangement. Therefore, because the composite refractive power of the first and the second groups of lenses is negative, and the composite refractive power of the third and the fourth groups of lenses is negative on the wide side, the structure is so-called a reverse telephoto type, rendering it possible to have a wide angle of view while securing sufficient back focus necessary for an SLR system.

Furthermore, because the composite refractive power of the first to the third groups of lenses is negative, and the composite refractive power of the fourth group of lenses is positive, it has a telephoto type structure, which is advantageous for miniaturization. The above mentioned conditional expression (1) specifies the composite refractive power of the third and the fourth groups of lenses. As indicated in the conditional expression (1), the composite refractive power of the third and fourth groups of lenses is not negative but rather maintained in a weak positive range. As opposed to this structure, if the negative refractive power of the third group of lenses is structured stronger than the positive refractive power of the fourth group of lenses, and each of the lenses that compose the fourth group of lenses itself is also a telephoto type, then even though it would be effective in reducing the overall length on the tele side, it would be a major hindrance in constructing a high speed optical system.

In other words, the lower the tele ratio is, the more spherical aberration (especially spherical aberration on the tele side) becomes distorted from the positive direction to the negative direction as it separates from the optical axis, rendering it extremely difficult to secure the Petzval sum. Therefore, the zoom lens system according to the present embodiment avoids having a telephoto type lens structure by satisfying the range specified in the above conditional expression (1), thereby insuring speed in the optical system. In this manner, the design of the lens system of the present invention makes it possible to compensate the Petzval sum sufficiently, correct spherical aberration, especially spherical aberration on the tele side sufficiently, and to construct a high speed optical system.

When the lens system of the present invention is operated above the limits of this conditional expression (1), spherical aberration on the tele side becomes distorted (into the negative direction from the positive direction) as it separates from an optical axis that it becomes impossible to construct a high speed optical system and renders it difficult to secure the Petzval sum. At limits below those of the conditional expression (1), the positive refractive power of the composition of the third and the fourth groups of lenses becomes so strong that it would be disadvantageous for miniaturization.

The use of a negative lens group as the first lens group on the object side in the present invention avoids the problem of an increased diameter at the front portion of the lens system, or an increase in the overall size of the optical system, as compared to a zoom type lens system where a positive lens group is the first lens group. This is true particularly in the case where the lens system provides a wide angle such as 24 mm for use with 35 mm film.

The conditional expression (2) above specifies the preferred range for the focal length of the first group of lenses and is related to a range of movement of the first group of lenses when it functions as a compensator. Employing the range specified by this conditional expression (2) makes it possible to maintain a small diameter for the front lens of the lens system of the present invention. In addition, this range allows the lens system of the present invention to correct various aberrations, particularly aberrations related to angle of view such as distortion and astigmatic aberration, as well as spherical aberrations, in a well-balanced manner.

Above the limits provided in conditional expression (2), the refractive power of the first group of lenses becomes weak, which is advantageous from an aberration correction point of view, but is not preferable from the miniaturization point of view because the diameter of the front lens of the lens system, as well as an overall length of the lens system, will increase. Below the lower limits provided in conditional expression (2), the refractive power of the first group of lenses becomes so strong that spherical aberration, astigmatic aberration and a large negative distortion are generated. As such, correction of the various aberrations becomes extremely difficult.

Figure 2:
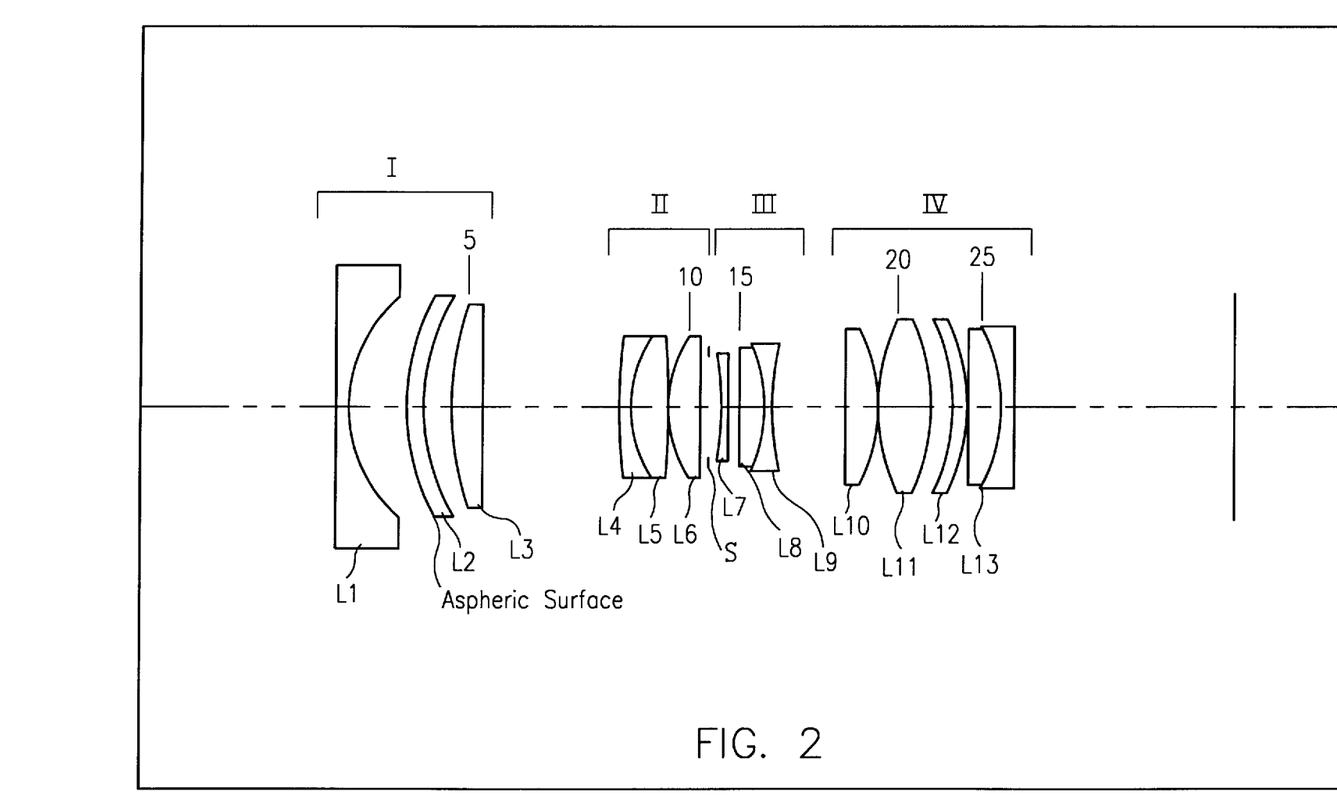
FIG. 2 is a cross-sectional side view illustrating a lens structure of a first preferred embodiment of the present invention.
Figure 3A:
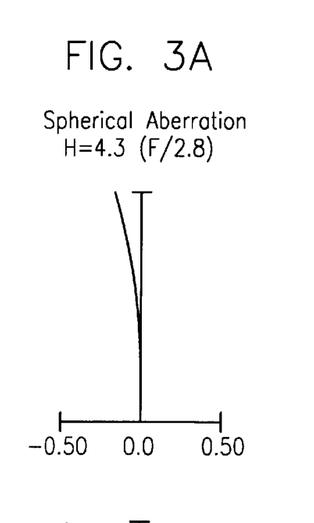
FIG. 3A–3D illustrate in graphical form the performance of the first preferred embodiment of the present invention with respect to spherical aberration, astigmatism, distortion and lateral aberration, respectively, for a focal length value of f=24.5.
Figure 3B:
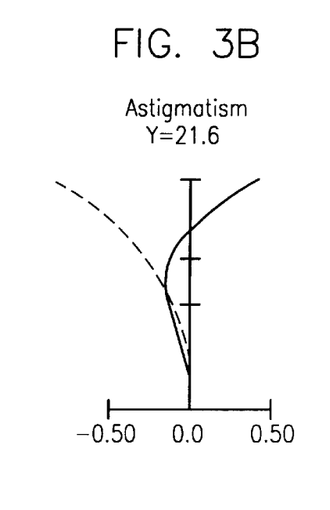
Figure 3C:
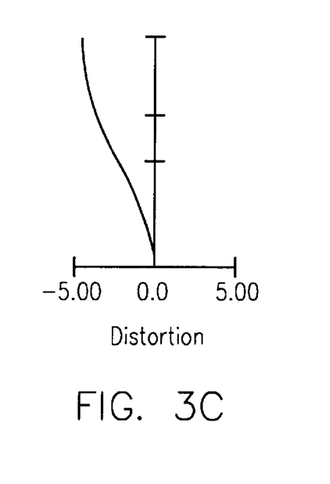
Figure 3D:
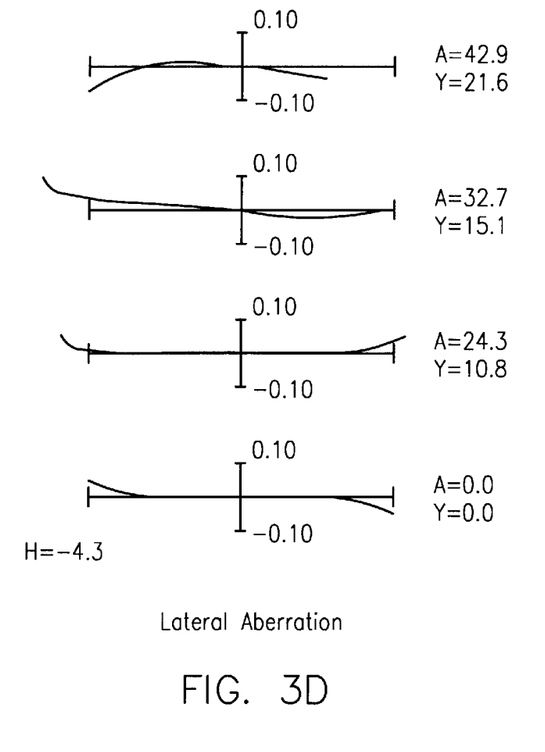
Figure 4A:
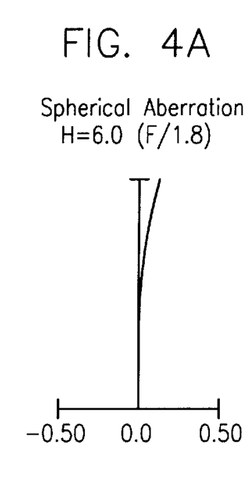
FIG. 4A–4D illustrate in graphical form the performance of the first preferred embodiment of the present invention with respect to spherical aberration, astigmatism, distortion and lateral aberration, respectively, for a focal length value of f=34.5.
Figure 4B:
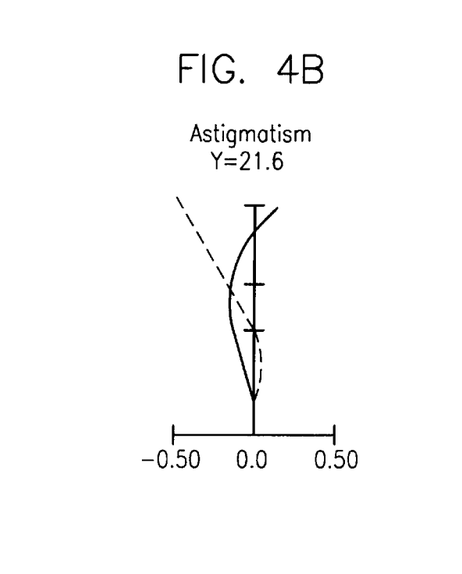
Figure 4C:
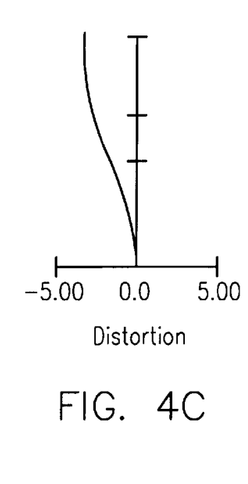
Figure 4D:
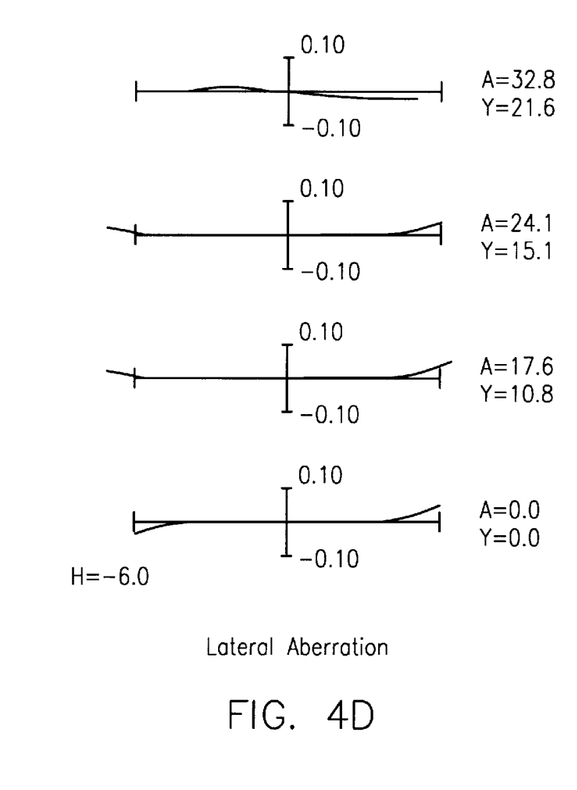
Figure 5A:
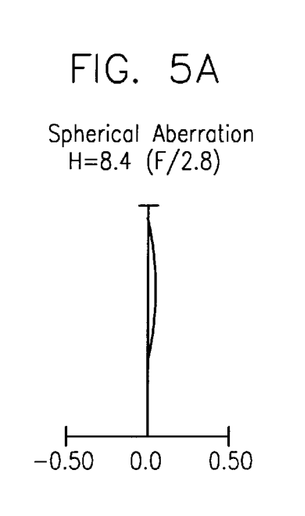
FIG. 5A–5D illustrate in graphical form the performance of the first preferred embodiment of the present invention with respect to spherical aberration, astigmatism, distortion and lateral aberration, respectively, for a focal length value of f=48.5.
Figure 5B:
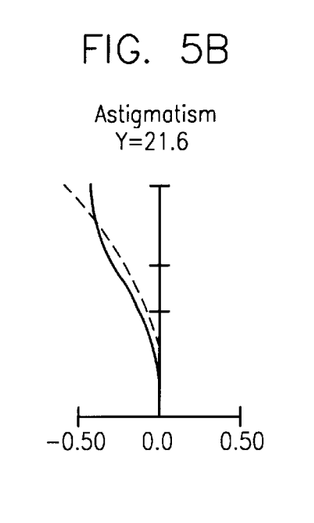
Figure 5C:
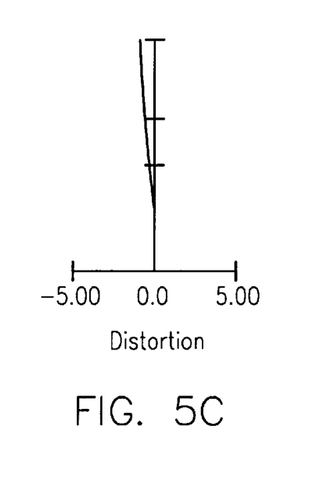
Figure 5D:
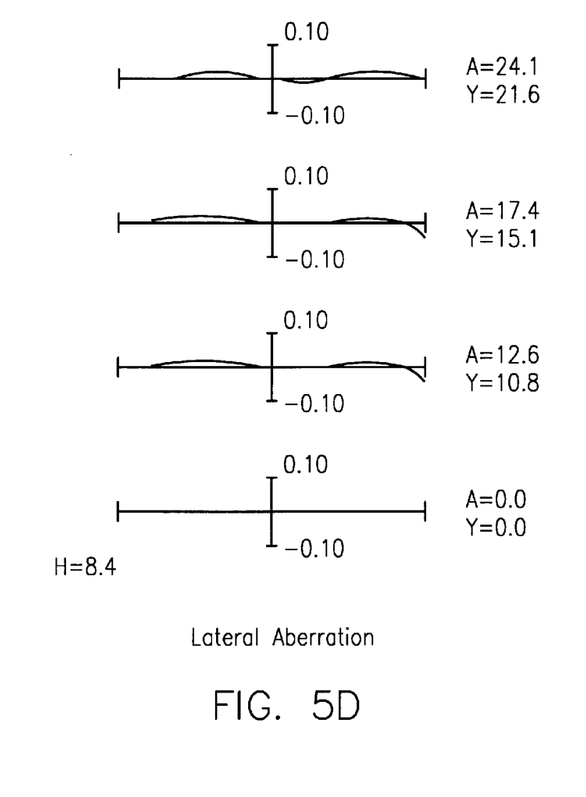
Figure 6:
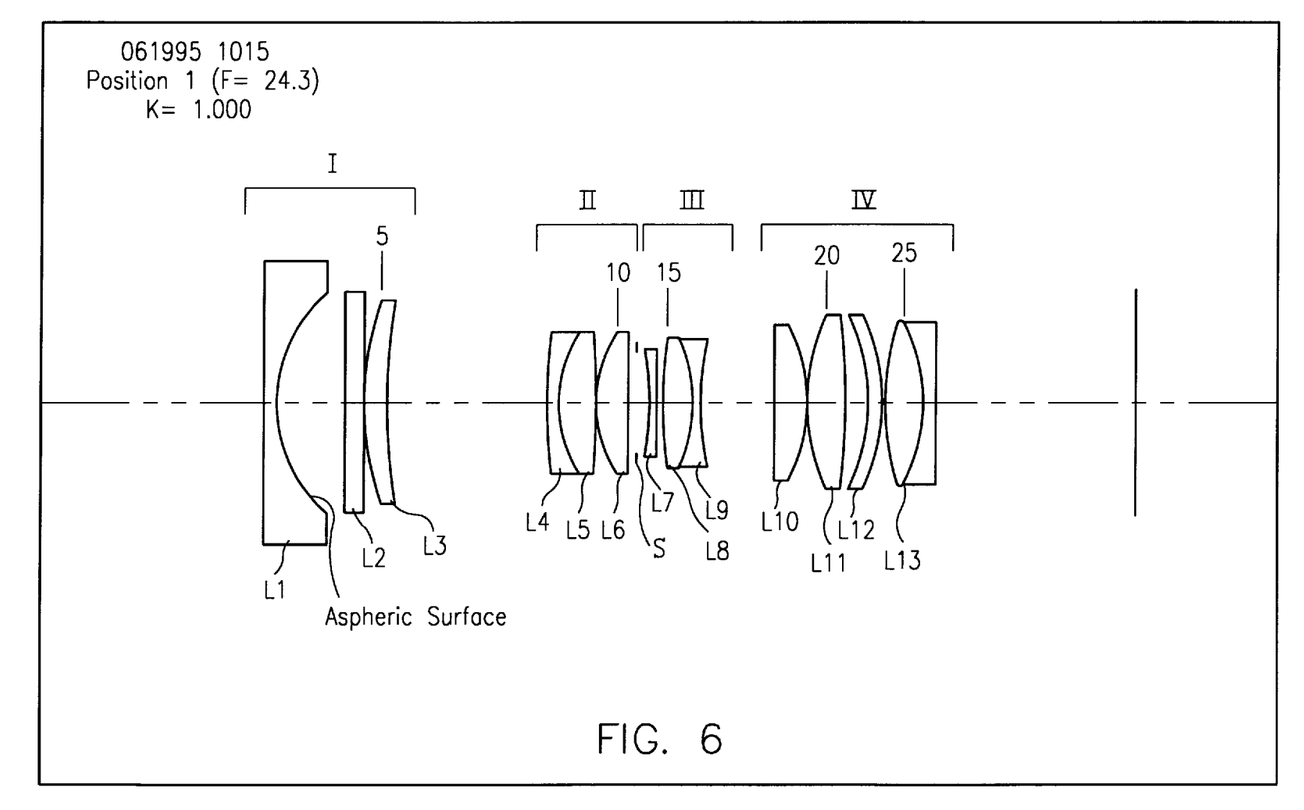
FIG. 6 is a cross-sectional side view illustrating a lens structure of a second preferred embodiment of the present invention.
Figure 7A:
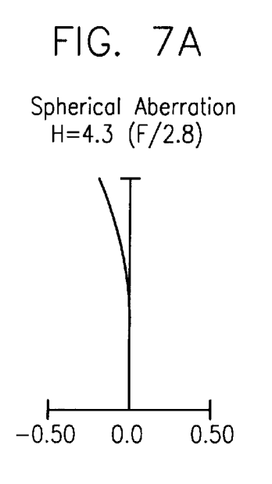
FIG. 7A–7D illustrate in graphical form the performance of the first preferred embodiment of the present invention with respect to spherical aberration, astigmatism, distortion and lateral aberration, respectively, for a focal length value of f=24.5.
Figure 7B:
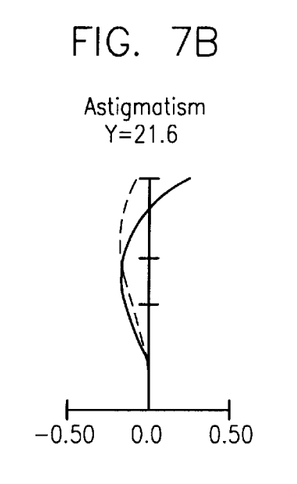
Figure 7C:
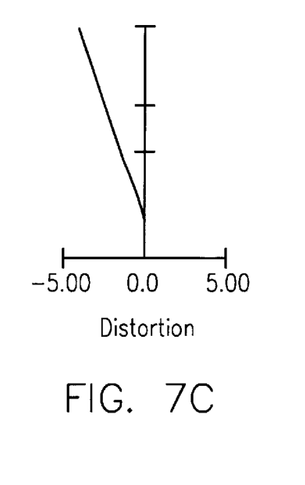
Figure 7D:
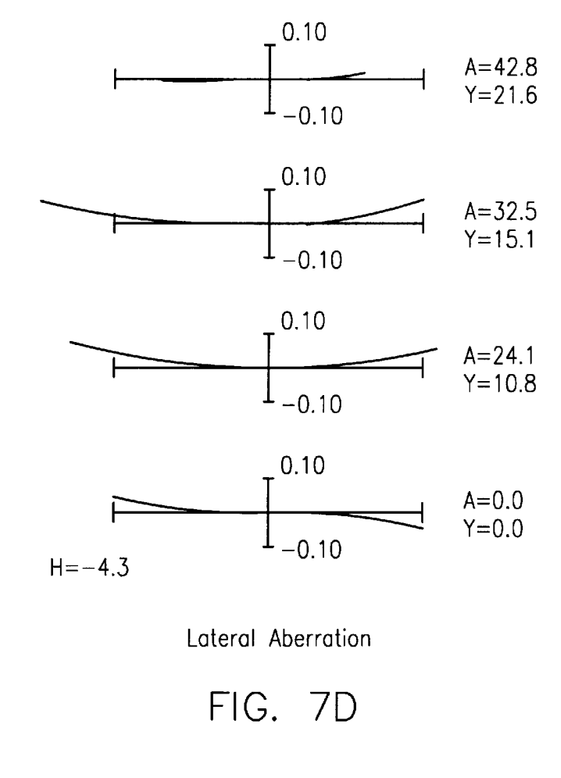
Figure 8A:
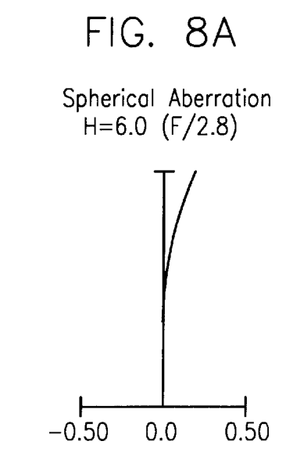
FIG. 8A–8D illustrate in graphical form the performance of the first preferred embodiment of the present invention with respect to spherical aberration, astigmatism, distortion and lateral aberration, respectively, for a focal length value of f=34.5.
Figure 8B:
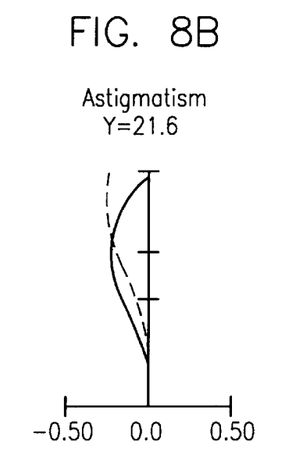
Figure 8C:
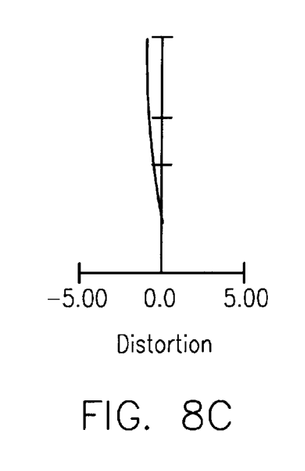
Figure 8D:
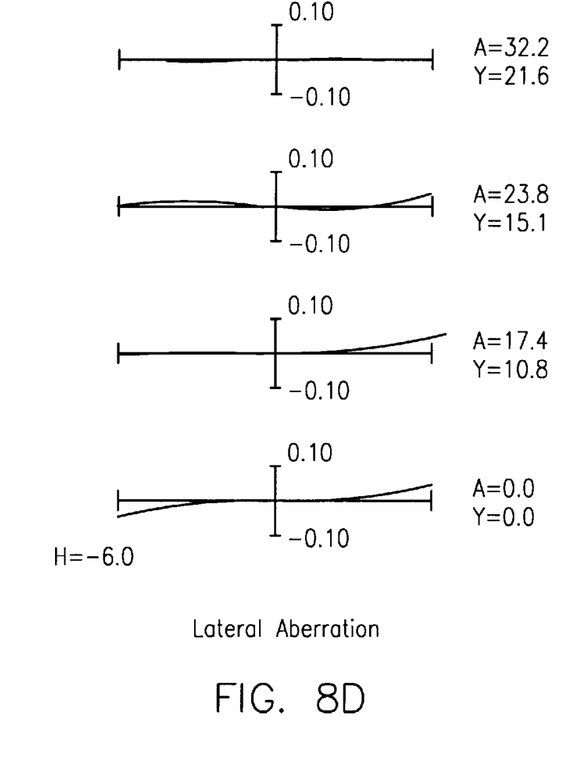
Figure 9A:
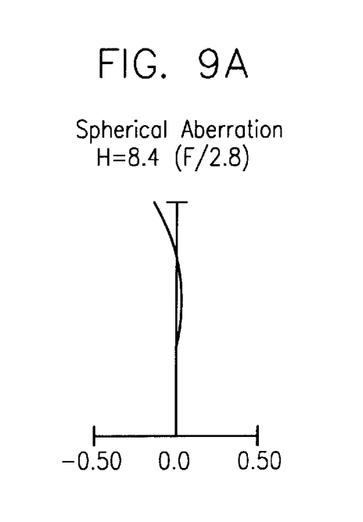
FIG. 9A–9D illustrate in graphical form the performance of the first preferred embodiment of the present invention with respect to spherical aberration, astigmatism, distortion and lateral aberration, respectively, for a focal length value of f=48.5.
Figures 9B, 9D:
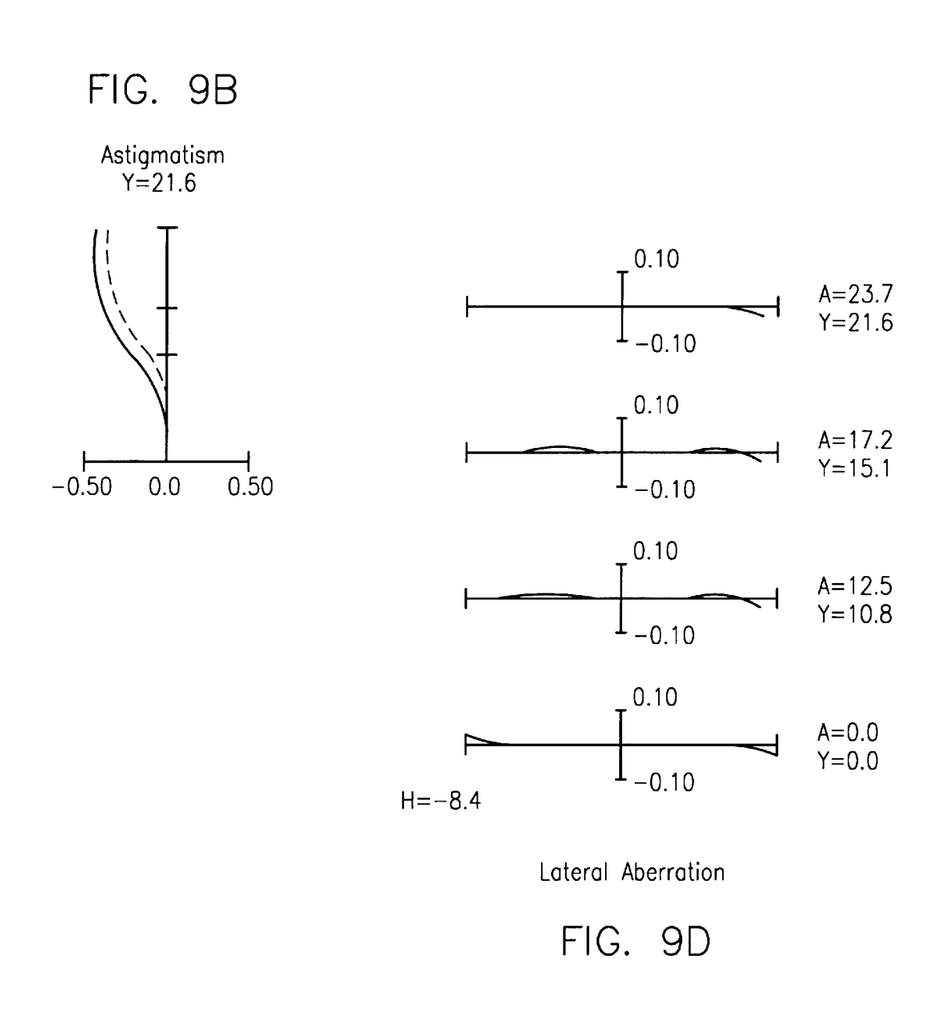
Figure 9C:
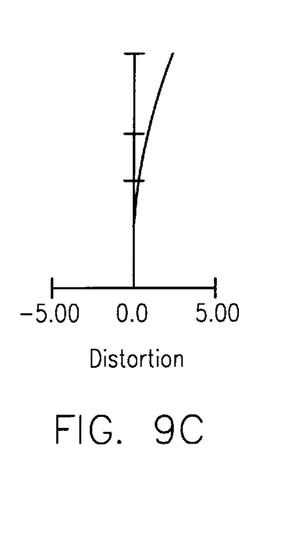

In accordance with one aspect of the present invention, as seen for example in the embodiments illustrated in FIGS. 2 and 6, the fourth group of lenses has two positive lens elements, a negative lens element as well as a positive lens element. In addition, a positive lens is disposed on the object side of a so-called triplet type. In other words, the fourth group of lenses is structured in such a manner that the triplet type is optimal for a finite distance specification. By arranging the fourth group of lenses in this fashion, the ability of the zoom lens system of the present invention to correct spherical aberration is significantly improved. In contrast to the above-described embodiment, if the fourth group of lenses was structured to be a so-called telephoto type, although miniaturization would be possible, it would not be possible to accommodate a wider angle of view and a larger aperture.

Furthermore, as the above-described embodiments of the present invention utilize a diaphragm disposed on the object side of the fourth group of lenses, aberration related to angle of view such as coma aberration is significantly improved. As such, this structure realizes a high speed zoom lens system that is suitable for a large angle of view.

With respect to the structure of the fourth group of lenses, in accordance with one embodiment of the present invention the fourth lens group satisfies the following conditional expression (3):

$$-1.7 < (r_{412} + r_{411})/(r_{412} - r_{411}) < -0.7 \quad (3),$$

wherein, $r_{411}$: represents an objectwise radius of curvature of a positive lens on the most object side of the fourth group of lenses; and $r_{412}$: represents an imagewise radius of curvature of a positive lens on the most object side of the fourth group of lenses.

The conditional expression (3) relates to a shape of the positive lens disposed on the most object side of the fourth group of lenses. The appropriate lens arrangement for the fourth group of lenses should be such that, as described above, at least one positive lens is disposed on the most object side of a triplet so as to optimize the performance of the triplet with respect to the finite object distance. This positive lens functions in part to have a ray bundle from an axial object point at a finite distance incident on the lens system behind said positive lens so as to effectively correct spherical aberration. Above the limits of the conditional expression (3), spherical aberration would remain due to the contribution by the third group of lenses, while below the limits of expression (3) negative spherical aberration would remain. In addition to the effects on spherical aberration, coma aberration will have more asymmetrical elements outside of the range specified by condition (3), which is obviously not preferable.

It is clear from the above discussion associated with conditional expression (1) that the power of the first group of lenses greatly contributes to the correction of distortion, astigmatic aberration and the like, as well as the size of the front lens diameter. However, the lens type employed by the first group of lenses also has an influence on the performance of the lens system of present invention in connection with these matters.

With respect to aberration correction, a thicker lens is advantageous, but a thin lens is more convenient in terms of reducing the diameter of the front lens. Therefore, in order to arrange the lenses so that distortion and astigmatic aberration are maintained at acceptable or favorable levels while also maintaining the diameter of the front lens at a desired small size, it is preferable to structure the first group of lenses with three lens elements, which are, viewed from the object side, in order of succession, a negative meniscus lens with its convex surface facing the object side, a negative lens, and a positive lens. By disposing the negative meniscus lens with the convex surface facing the object side closest to the object (i.e. positioned the most object side of the first lens group), a ray bundle with a large angle of incidence can be refracted so as to be incident on the second lens with a smaller angle of incidence, while preventing the occurrence of aberrations related to the angle of view such as distortion and astigmatic aberration. In addition, with a positive lens on the most image side of the first lens group, remaining negative distortion and coma aberration with respect to the rays below the principal ray will also be well corrected.

In order to correct distortion, especially large negative distortion generated on the wide side, it is desirable to employ an aspherical surface in the first group of lenses. This aspherical surface, which is provided to correct distortion, can be expected to be effective in any surface of the first group of lenses, but has been found to be more effective when employed more on the object side. This aspherical surface, in whichever surface it is employed, should have a shape that would correct a large negative distortion occurring with respect to a large angle of view.

In addition to the above-discussed characteristics of the first lens group, it is preferable if a positive lens element on the most image side of the fourth group of lenses is structured as a cemented doublet, formed of a positive lens and a negative lens, with the cemented surface being concave and facing the object. The focal length $f_S$ of the cemented surface of this doublet should satisfy the conditional expression (4):

$$2.0 < |f_S / f_4| < 4.0 \quad (4)$$

A ray bundle from an axial object point and a ray bundle from an off-axial object point pass through significantly different positions at a surface on the image side of the fourth group of lenses because of the diaphragm positioned on the object side of the fourth group of lenses. Therefore, by having the cemented doublet, built up of a positive lens and a negative lens, as a positive lens on the most image side of the fourth group of lenses, and making the cemented surface concave facing the object, influence to distortion is controlled, lateral chromatic aberration is corrected, and coma aberration is also controlled, while the occurrence of higher order meridional field curvature is prevented. The cemented surface has a negative power and corrects coma aberration with respect to the rays above the principle ray, thereby preventing higher order curvature from occurring.

The conditional expression (4) specifies an appropriate range of refractive power at the cemented surface: above the limits of expression (4), the refractive power of the cemented surface becomes so weak that contribution to aberration correction is reduced, while below the lower limits of expression (4), the refractive power of the cemented surface becomes so strong that large coma aberration is generated, rendering it difficult to correct.

It is desirable that the negative lens element of the fourth group of lenses has a meniscus shape with the concave surface facing the object side. The negative lens element should also have a structure satisfying the following conditional expressions (5) and (6):

$$2.0 < |f_N/f_4| < 8.0 \tag{5}$$

$$1.8 < (r_{N2} + r_{N1})/(r_{N2} - r_{N1}) < 7.0, \tag{6}$$

where:
$f_N$ represents a focal length of said negative lens in the fourth group of lenses,
$r_{N1}$ represents a radius of curvature of said negative lens on the object side, and
$r_{N2}$ represents a radius of curvature of said negative lens on the image side.

The conditions which this negative lens should satisfy are necessary in part due to having the diaphragm positioned on the object side of the fourth group of lenses. In addition, the negative lens also controls coma aberration so as to prevent the influence of distortion and meridional field curvature caused by higher order aberrations.

The conditional expression (5) relates to the optimal power this negative lens may have. Above the upper limits set forth in expression (5) the power of this negative lens becomes too weak to effectively act on correcting aberration, and thus does not contribute to securing the Petzval sum. Below the lower limits, the power of this negative lens becomes so strong that a large positive coma aberration is generated, rendering it no longer possible to correct.

The conditional expression (6) supplements conditional expression (5) and prescribes the shape this negative lens should have. By providing the negative lens with the shape described by the range of expression (6), it is possible to have an oblique ray bundle incident with an angle of incidence that would minimize the occurrence of aberrations. In addition, the occurrence of coma aberration can also be controlled, rendering it possible to correct aberrations in a well-balanced manner.

As described above, a lens system in accordance with the present invention includes features which allow for a wide angle zoom lens that is compact and capable of producing high quality images. Additional details of the zoom lens system in accordance with the present invention will now be described.

FIG. 2 shows a lens structure of one embodiment of the zoom lens system according to the present invention. As seen therein, the zoom lens system, when viewed from the object side to the image side, in order of succession, includes a first group of lenses I with negative refractive power, a second group of lenses II with positive refractive power, a diaphragm S, a third group of lenses III with negative refractive power as well as a fourth group of lenses IV with positive refractive power.

In the present embodiment, as shown in FIG. 1, during the zoom operation from the wide side to the tele side, the first group of lenses I moves in a manner that it draws a convex locus with respect to the image side, the second group of lenses II moves to the object side, the third group of lenses III moves in a manner that it draws a convex locus with respect to the image side, and the fourth group of lenses IV moves to the object side. During this zooming operation, the air gap between the first group of lenses I and the second group of lenses II decreases, the air gap between the second group of lenses II and the third group of lenses III increases, and the air gap between the third group of lenses and the fourth group of lenses decreases.

Referring back to FIG. 2, the first group of lenses I includes, viewed from the object side to the image side, in order of succession, a negative meniscus lens L1 with its convex surface facing the object side, a negative meniscus lens L2 with its convex surface facing the object side in the same manner, and a positive meniscus lens L3 with its convex surface facing the object side. Continuing from the objects to the image side, the second group of lenses II includes, a negative meniscus lens L4 with its concave surface facing the image side and a positive lens L5 which has a biconvex shape, and therefore comprises, as a whole, a biconvex positive lens and a positive lens L6 with a convex surface facing the object side. The third group of lenses III includes, from the object side, a negative lens L7 with a concave surface facing the object side, and a cemented doublet formed from a positive lens L8 with a convex surface facing the image side and a negative lens L9 which is biconcave. The fourth group of lenses IV includes, from the object side, a positive lens L10 with a convex surface facing the image side, a positive lens L11 which is biconvex, a negative lens L12 with a concave surface facing the object side, and a cemented doublet L13 formed from a positive lens with a convex surface facing the image side and a negative lens with a concave surface facing the object side.

In addition to the above described lens structure, in accordance with a first embodiment of the zoom lens system of the present invention, a diaphram S is disposed with the third group of lenses, and during the movement for focal length adjustment, the diaphram S and the third group of lenses III move as one. Furthermore, in the first embodiment, a lens surface on the object side of the negative meniscus lens L2 in the first group of lenses is aspherical.

FIG. 6 shows a lens structure of a zoom lens system in accordance with a second embodiment of the present invention. In FIG. 6, the zoom lens system, viewed from the object side, includes in order of succession, a first group of lenses I with negative refractive power, a second group of lenses II with positive refractive power, a diaphram S, a third group of lenses III with negative refractive power, and a fourth group of lenses IV with positive refractive power. In this embodiment, the movement of each lens group is almost the same as that of the previously described embodiment, and accordingly discussion of such movement will be omitted.

In the second embodiment, as viewed from the object side the first group of lenses I includes, a negative meniscus lens L1 with its concave surface facing the image side, a meniscus lens L2 with its convex surface facing the object side, and a positive meniscus lens L3 with its convex surface facing the object side. The second group of lenses II includes, in order of succession, a negative meniscus lens L4 with its concave surface facing the image side as well as a positive lens L5 which is biconvex, and therefore, as a whole, comprises, a positive biconvex lens, and a positive lens L6 with its convex surface facing the object side. The third group of lenses III includes a negative lens L7 with its concave surface facing the object side, a cemented doublet built up of a biconvex lens L8 with a convex surface facing the image side and a negative lens L9 which is biconcave. The fourth group of lenses IV comprises, viewed from the object side, in order of succession, a positive lens L10 with its convex surface facing the image side, a positive lens L11 which is biconvex, a negative lens L12 with its concave surface facing the object side, and a cemented doublet built up of a positive lens with its convex surface facing the image side and a negative lens with its concave surface facing the object side.

In accordance with the second embodiment, a diaphram S is disposed with the third group of lenses III, and during the movement for focal length adjustment, the diaphram S moves with the third group of lenses III. Further, according to the second embodiment, a lens surface on the image side of negative meniscus lens L1 in the first lens group I is aspherical.

In the following Tables 1 and 2, numerical values for the embodiments shown in FIGS. 2 and 6, respectively, are provided. In the Tables, R represents a radius of curvature of a lens surface, D represents a respective air gap between each lens surface, and $N_d$ is a refractive index of a glass material with respect to a d line, and v is an Abbe number. In addition, $f_3$ is composite focal length of the third group of lenses III, $f_4$ is a composite focal length of the fourth group of lenses IV, $f_1$ is a composite focal length of the first group of lenses I, $f_W$ is a focal length of the zoom lens system on the wide side, $f_T$ is a focal length of the zoom lens system on the tele side.

The shape of an aspherical surface can be expressed as shown below, if an x-axis is in the optical axis direction, an h-axis is in the direction orthogonal to the optical axis, the direction of a ray is positive, R is a paraxial radius of curvature, and aspherical surface coefficients are $A_1, A_2, A_3$, and $A_4$, and k is a conic constant, $$x = \frac{(1/R)h^2}{1 + \sqrt{1 - k(1/R)^2 h^2}} + A_1 h^4 + A_2 h^6 + A_3 h^8 + A_4 h^{10}.$$

TABLE 1 f = 24.5 ~ 34.5 ~ 48.5 mm, F/2.8

|  | SN | R | D | $N_d$ | Y |
|---|---|---|---|---|---|
| L1 | 1 | 251.7097 | 1.7000 | 1.74810 | 52.28 |
|  | 2 | 25.3387 | 7.3000 |  |  |
| L2 | 3* | 59.1496 | 3.0000 | 1.69680 | 55.61 |
|  | 4 | 38.5055 | 4.5970 |  |  |
| L3 | 5 | 62.6880 | 4.5380 | 1.86074 | 23.00 |
|  | 6 | 181.1265 | Variable |  |  |
| L4–5 | 7 | 65.0169 | 1.7000 | 1.84666 | 23.82 |
|  | 8 | 25.7899 | 8.3250 | 1.51680 | 64.12 |
|  | 9 | −126.0725 | 0.1000 |  |  |
| L6 | 10 | 34.2492 | 5.5990 | 1.72000 | 50.28 |
|  | 11 | 551.9646 | Variable |  |  |
|  | D12 | 0.0000 | 2.5000 |  |  |
| L7 | 13 | −43.6040 | 1.7000 | 1.74400 | 45.06 |
|  | 14 | 537.9900 | 2.3920 |  |  |
|  | 15 | −1000.0000 | 4.9150 | 1.80458 | 25.49 |
| L8–9 | 16 | −25.8752 | 1.7000 | 1.71700 | 48.12 |
|  | 17 | 115.0743 | Variable |  |  |
| L10 | 18 | 4680.4013 | 5.6430 | 1.73350 | 51.11 |
|  | 19 | −36.0083 | 0.1000 |  |  |
| L11 | 20 | 68.3184 | 5.7190 | 1.65160 | 58.54 |
|  | 21 | −73.4550 | 2.8130 |  |  |
| L12 | 22 | −39.8504 | 1.7000 | 1.79504 | 28.61 |
|  | 23 | −79.4825 | 0.1000 |  |  |
| L13 | 24 | −548.0632 | 6.5050 | 1.62041 | 60.29 |
|  | 25 | −29.7507 | 1.7000 | 1.86074 | 23.00 |
|  | 26 | −418.2519 |  |  |  |

*Aspherical Surface $A_1 = 0.7678 = 10^{-5}$
$A_2 = 0.8151 \times 10^{-8}$
$A_3 = -0.9374 \times 10^{-11}$
$A_4 = 0.2668 \times 10^{-13}$ TABLE 1-continued f = 24.5 ~ 34.5 ~ 48.5 mm, F/2.8

K = 1.0
Variable D Table

| f | 24.5 | 34.5 | 48.5 |
|---|---|---|---|
| D6 | 27.6927 | 12.0623 | 1.0000 |
| D11 | 1.0000 | 8.2989 | 15.7039 |
| D17 | 14.3618 | 8.6361 | 2.8473 |
| D26 | 37.9994 | 41.5185 | 48.1486 |

$f_1 = -44.925; f_2 = 41.728; f_3 = -44.273; f_4 = 39.806; f_N = -102.470$

TABLE 2 f = 24.5 ~ 34.5 ~ 48.5 mm, F/2.8

|  | SN | R | D | $N_d$ | Y |
|---|---|---|---|---|---|
| L1 | 1 | 213.0216 | 1.7000 | 1.77279 | 49.44 |
|  | 2* | 23.2585 | 11.0030 |  |  |
| L2 | 3 | 496.4966 | 3.0000 | 1.69680 | 55.61 |
|  | 4 | 249.9164 | 0.1000 |  |  |
| L3 | 5 | 41.3034 | 4.5910 | 1.86074 | 23.00 |
|  | 6 | 65.5133 | variable |  |  |
| L4–5 | 7 | 71.2235 | 1.5000 | 1.84666 | 23.82 |
|  | 8 | 26.5288 | 7.5450 | 1.51680 | 64.12 |
|  | 9 | −195.8696 | 0.1000 |  |  |
| L6 | 10 | 44.1757 | 5.4920 | 1.77279 | 49.44 |
|  | 11 | −237.0751 | variable |  |  |
|  | D12 | 0.0000 | 3.0000 |  |  |
| L7 | 13 | −40.1526 | 1.7000 | 1.74400 | 45.06 |
|  | 14 | 131.1518 | 1.0000 |  |  |
|  | 15 | 42.9285 | 4.9800 | 1.80458 | 25.49 |
| L8–9 | 16 | −70.9154 | 1.7000 | 1.71700 | 48.12 |
|  | 17 | 41.7347 | variable |  |  |
| L10 | 18 | −208.1704 | 5.0000 | 1.74400 | 45.06 |
|  | 19 | −33.1322 | 0.1000 |  |  |
| L11 | 20 | 101.9474 | 4.6350 | 1.76684 | 46.76 |
|  | 21 | −178.5845 | 2.3410 |  |  |
| L12 | 22 | −56.7435 | 1.5000 | 1.79504 | 28.61 |
|  | 23 | −78.0953 | 0.1000 |  |  |
| L13– | 24 | 104.7901 | 8.5090 | 1.62041 | 60.29 |
| 14 | 25 | −26.0195 | 1.7000 | 1.86074 | 23.00 |
|  | 26 | 1232.8790 |  |  |  |

*Aspherical Surface $A_1 = -0.3676 = 10^{-5}$
$A_2 = -0.5496 \times 10^{-8}$
$A_3 = 0.3604 \times 10^{-11}$
$A_4 = -0.1068 \times 10^{-13}$
K = 0.6373
Variable D Table

| f | 24.5 | 34.5 | 48.5 |
|---|---|---|---|
| D6 | 31.4924 | 14.2050 | 1.9212 |
| D11 | 1.2240 | 9.3427 | 17.5804 |
| D17 | 13.3568 | 8.8167 | 3.6965 |
| D26 | 37.9905 | 41.1789 | 47.5341 |

$f_1 = -47.694; f_2 = 44.273; f_3 = -46.174; f_4 = 39.121; f_N = -269.430$

In Table 3 shown below, the corresponding values for the embodiments of FIGS. 2 and 6 are provided with respect to the conditional expressions (1) through (6) above:

TABLE 3

| Conditional Expression | Embodiment FIG 2 | Embodiment FIG 6 |
|---|---|---|
| (1) $|f_4/f_3|$ | 0.899 | 0.847 |
| (2) $|f_1|/\sqrt{f_w \cdot f_T}$ | 1.304 | 1.384 |

TABLE 3-continued

| Conditional Expression | Embodiment FIG 2 | Embodiment FIG 6 |
|---|---|---|
| (3) $(r_{412} + r_{411})/(r_{412} - r_{411})$ | −0.985 | −1.379 |
| (4) $\|f_S/f_4\|$ | +3.110 | +2.767 |
| (5) $\|f_N/f_4\|$ | +2.574 | +6.887 |
| (6) $(r_{N2} + r_{N1})/(r_{N2} - r_{N1})$ | 3.011 | 6.315 |

FIGS. 3A–3D, 4A–4D and 5A–5D show various aberrations for the embodiment of FIG. 2 for three respective values of the focal length. FIGS. 3A–3D corresponds to the situation when the focal length of the embodiment of FIG. 2 is the shortest (f=24.5), FIGS. 4A–4D correspond to the focal length being medium (f=34.5), and FIGS. 5A–5D correspond to the focal length being the longest (f=48.5), respectively. FIGS. 7A–7C, 8A–8D, and 9A–9D show various aberrations for the embodiment of FIG. 6 for three respective values of the focal length. FIGS. 7A–7D correspond to the situation when the focal length of the embodiment of FIG. 6 is the shortest (f=24.5), FIGS. 8A–8D correspond to the focal length being medium (f=34.5), and FIGS. 9A–9D correspond to the focal length being the longest (f=48.5), respectively. It should be noted that in the figures illustrating astigmatism (FIGS. 3B, 4B, 5B, 7B, 8B and 9B), the broken lines express a meridional image surface, while the solid lines express a sagittal image surface.

As shown in FIGS. 3A through 5D and 7A through 9D, which show the various aberrations discussed above, the zoom lens system according to the embodiments of FIGS. 2 and 6 has fine imaging performance despite the zoom ratio of 2× and the speed which is as fast as F/2.8 with an angle of view of 84° on the wide side.

The embodiments of the zoom lens illustrated in FIGS. 2 and 6, are designed to obtain optimal lens performance when a diaphram S between the second group of lenses II and the third group of lenses III is disposed as a part of the third group of lenses III (i.e. it moves with the third lens group). However, those skilled in the optical arts will readily appreciate that it is also possible to alter the designs of FIGS. 2 and 6 such that, for example, the diaphram is disposed with the second group of lenses II. Alternatively, the diaphram S could also be arranged, for example, on the object side of the second group of lenses II, within the third group of lenses III, or on the image side thereof as long as it is between the second group of lenses II and the fourth group of lenses IV.

Numerous other modifications, additions and substitutions may be made to the preferred embodiments of the present invention without departing from the spirit and scope thereof. It is intended that all such modifications, additions and substitutions fall within the scope of the present invention which is best defined by the claims appended hereto.

What is claimed is:

1. A large aperture, wide angle zoom lens system comprising, viewed from the object side, in order of succession, a first group of lenses with negative refractive power;

a second group of lenses with positive refractive power;

a third group of lenses with negative refractive power; as well as a fourth group of lenses with a positive refractive power; wherein, a diaphragm is disposed between said second group of lenses and said fourth group of lenses, and during zooming from a wide side to a tele side in said wide angle zoom lens system, a respective air gap between each of said groups of lenses is changed so as to decrease the air gap between said first group of lenses and said second group of lenses, increase the air gap between said second group of lenses and said third group of lenses, and to decrease the air gap between said third group of lenses and said fourth group of lenses; and said fourth group of lenses includes, viewed from the object side, in order of succession, at least two positive lens elements, a first negative lens element as well as a positive lens element, and said zoom lens system satisfies the following conditional expressions:

$$0.8 < |f_4/f_3| < 1.0$$

$$1.2 < |f_1|/\sqrt{f_w \cdot f_T} < 1.5$$

$$-1.7 < (r_{412} + r_{411})/(r_{412} - r_{411}) < -0.7$$

where, $f_3$: is a composite focal length of the third group of lenses, $f_4$: is a composite focal length of the fourth group of lenses, $f_1$: is a composite focal length of the first group of lenses, $f_w$: is a focal length of said zoom lens system on a wide side thereof, $f_T$: is a focal length of said zoom lens system on a tele side thereof, $r_{411}$: is an objectwise radius of curvature of a positive lens on a most object side of the fourth group of lenses, and $r_{412}$: is an imagewise radius of curvature of a positive lens on a most image side of the fourth group of lenses.

2. A zoom lens system as claimed in the claim 1, wherein said first group of lenses has, viewed from the object side, in order of succession, a negative meniscus lens with its convex surface facing the object side, a negative lens, and a positive lens.

3. A zoom lens system as claimed in the claim 2, wherein said first group of lenses includes at least one aspherical surface.

4. A zoom lens as claimed in the claim 3, wherein a positive lens element on the most image side of said fourth group of lenses comprises a cemented doublet including a positive lens and a second negative lens, a cemented surface of said cemented doublet is facing its concave surface to the object side, and said zoom lens system satisfies the following conditional:

$$2.0 < |f_S/f_4| < 4.0$$

where, $f_4$: is a composite focal length of the fourth group of lenses, and $f_S$: is a focal length of the cemented surface of said cemented doublet.

5. A zoom lens system as claimed in the claim 4, wherein said first negative lens element in said fourth group of lenses has its concave surface facing the object side, and said zoom lens system satisfies the following conditional expressions:

$$2.0 < |f_N/f_4| < 8.0$$

$$1.8 < (r_{N2} + r_{N1})/(r_{N2} - r_{N1}) < 7.0$$

where, $f_N$: is a focal length of said first negative lens element of the fourth group of lenses, $f_4$: is a composite focal length of the fourth group of lenses, $f_1$: is a composite focal length of the first group of lenses, $f_w$: is a focal length of said zoom lens system on the wide side, $r_{N1}$: is a radius of curvature of a lens surface on the object side of said first negative lens element of the fourth group of lenses, and $r_{N2}$: is a radius of curvature of a lens surface on the image side of said first negative lens element of the fourth group of lenses.

6. A zoom lens system as claimed in the claim 3, wherein said first negative lens element in said fourth group of lenses has its concave surface facing the object side, and said zoom lens system satisfies the following conditional expressions:

$$2.0 < |f_N/f_4| < 8.0$$

$$1.8 < (r_{N2} + r_{N1})/(r_{N2} - r_{N1}) < 7.0$$

where, $f_N$: is a focal length of said first negative lens element in the fourth group of lenses, $f_4$: is a composite focal length of said fourth group of lenses, $f_1$: is a composite focal length of the first group of lenses, $f_w$: is a focal length of said zoom lens system on the wide side, $r_{N1}$: is a radius of curvature of a lens surface on the object side of said first negative lens element of the fourth group of lenses, and $r_{N2}$: is a radius of curvature of a lens surface on the image side of said first negative lens element of the fourth group of lenses.

7. A zoom lens system as claimed in the claim 1, wherein a positive lens element on the most image side of said fourth group of lenses comprises a cemented doublet including a positive lens and second negative lens, a cemented surface of said cemented doublet having its concave surface facing the object side, and said zoom lens system satisfies the following conditional expressions:

$$2.0<|f_S/f_4|<4.0$$

where, $f_4$: is a composite focal length of said fourth group of lenses, and $f_S$: is a focal length of the cemented surface of said doublet.

8. A zoom lens system as claimed in the claim 7, wherein said first negative lens element in said fourth group of lenses has its concave surface facing the object side, and said zoom lens system satisfies the following conditional expressions:

$$2.0 < |f_N/f_4| < 8.0$$

$$1.8 < (r_{N2} + r_{N1})/(r_{N2} - r_{N1}) < 7.0$$

where, $f_N$: is a focal length of said first negative lens element in the fourth group of lenses, $f_4$: is a composite focal length of said fourth group of lenses, $f_1$: is a composite focal length of the first group of lenses, $f_w$: is a focal length of said zoom lens system on the wide side, $r_{N1}$: is a radius of curvature of a lens surface on the object side of said first negative lens element of the fourth group of lenses, and $r_{N2}$: is a radius of curvature of a lens surface on the image side of said first negative lens element of the fourth group of lenses.

9. A zoom lens system as claimed in the claim 2, wherein said first negative lens element in said fourth group of lenses has its concave surface facing the object side, and said zoom lens system satisfies the following conditional expressions:

$$2.0 < |f_N/f_4| < 8.0$$

$$1.8 < (r_{N2} + r_{N1})/(r_{N2} - r_{N1}) < 7.0$$

where, $f_N$: is a focal length of said first negative lens element in the fourth group of lenses, $f_4$: is a composite focal length of the fourth group of lenses, $f_1$: is a composite focal length of the first group of lenses, $f_w$: is a focal length of said zoom lens system on the wide side, $r_{N1}$: is a radius of curvature of a lens surface on the object side of said first negative lens element of the fourth group of lenses, and $r_{N2}$: is a radius of curvature of a lens surface on the image side of said first negative lens element of the fourth group of lenses.

10. A zoom lens system as claimed in the claim 1, wherein said first group of lenses includes at least one aspherical surface.

11. A zoom lens system as claimed in the claim 10, wherein a positive lens element on the most image side in said fourth group of lenses comprises a cemented doublet including a positive lens and a second negative lens, a cemented surface of said cemented doublet having its concave surface facing the object side, and said zoom lens system satisfies the following conditional expression:

$$2.0<|f_S/f_4|<4.0$$

where, $f_4$: is a composite focal length of said fourth group of lenses, and $f_S$: is a focal length of the cemented surface of said doublet.

12. A zoom lens system as claimed in the claim 11, wherein, said first negative lens element in said fourth group of lenses has its concave surface facing the object side, and said zoom lens system satisfies the following conditional expressions:

$$2.0 < |f_N/f_4| < 8.0$$

$$1.8 < (r_{N2} + r_{N1})/(r_{N2} - r_{N1}) < 7.0$$

where, $f_N$: is a focal length of said first negative lens element in the fourth group of lenses, $f_4$: is a composite focal length of the fourth group of lenses, $f_1$: is a composite focal length of the first group of lenses, $f_w$: is a focal length of said zoom lens system on the wide side, $r_{N1}$: is a radius of curvature of a lens surface on the object side of said first negative lens element of the fourth group of lenses, and $r_{N2}$: is a radius of curvature of a lens surface on the image side of said first negative lens element of the fourth group of lenses.

13. A zoom lens system as claimed in the claim 1, wherein, said first negative lens element in said fourth group of lenses has its concave surface is facing the object side, and said zoom lens system satisfies the following conditional expressions:

$$2.0 < |f_N/f_4| < 8.0$$

$$1.8 < (r_{N2} + r_{N1})/(r_{N2} - r_{N1}) < 7.0$$

where, $f_N$: is a focal length of said first negative lens element in the fourth group of lenses, $f_4$: is a composite focal length of the fourth group of lenses, $f_1$: is a composite focal length of the first group of lenses, $f_w$: is a focal length of said zoom lens system on the wide side, $r_{N1}$: is a radius of curvature of a lens surface on the object side of said first negative lens element of the fourth group of lenses, and $r_{N2}$: is a radius of curvature of a lens surface on the image side of said first negative lens element of the fourth group of lenses.

14. A zoom lens system as claimed in the claim 1, wherein, a positive lens element on the most image side in said fourth group of lenses comprises a cemented doublet including a positive lens and a negative lens, a cemented surface of said cemented doublet having its concave surface facing the object side, and said zoom lens system satisfying the following conditional expression:

$$2.0<|f_S/f_4|<4.0$$

where, $f_4$: is a composite focal length of said fourth group of lenses, and $f_S$: is a focal length of the cemented surface of said doublet.

15. A zoom lens system as claimed in the claim 14, wherein said first negative lens element in said fourth group of lenses has its concave surface facing the object side, and said zoom lens system satisfies the following conditional expressions:

$$2.0 < |f_N/f_4| < 8.0$$

$$1.8 < (r_{N2} + r_{N1})/(r_{N2} - r_{N1}) < 7.0,$$

where, $f_N$: is a focal length of said first negative lens element in the fourth group of lenses, $f_4$: is a composite focal length of said fourth group of lenses, $f_1$: is a composite focal length of the first group of lenses, $f_w$: is a focal length of said zoom lens system on the wide side, $r_{N1}$: is a radius of curvature of a lens surface on the object side of said first negative lens element of the fourth group of lenses, and $r_{N2}$: is a radius of curvature of a lens surface on the image side of said first negative lens element of the fourth group of lenses.

16. A zoom lens system as claimed in claim 1, further including a diaphragm, said diaphragm being disposed in said zoom lens system between said second and fourth groups of lenses.

17. A zoom lens system as claimed in claim 16, wherein said diaphragm is disposed between said second and third groups of lenses.

18. A zoom lens system as claimed in claim 17, wherein said diaphragm moves with said second lens group during a zooming operation in said zoom lens system.

19. A zoom lens system as claimed in claim 17, wherein said diaphragm moves with said third lens group during a zooming operation in said zoom lens system.

* * * * *